United States Patent [19]

Manty et al.

[11] 4,305,998

[45] Dec. 15, 1981

[54] PROTECTIVE COATING

[75] Inventors: Brian A. Manty, Lake Park; Vernon G. Anderson, Palm Beach Gardens, both of Fla.

[73] Assignee: The United States of America as represented by the Secretary of the Navy, Washington, D.C.

[21] Appl. No.: 118,132

[22] Filed: Feb. 4, 1980

[51] Int. Cl.$^3$ .............................................. B32B 15/20
[52] U.S. Cl. ................................... 428/661; 428/660; 428/663; 428/670; 428/671; 428/680
[58] Field of Search ............... 428/650, 652, 660–664, 428/667, 670–675, 680

[56] References Cited

U.S. PATENT DOCUMENTS

| | | | |
|---|---|---|---|
| 1,083,070 | 12/1913 | Eldred | 428/670 |
| 3,162,512 | 12/1964 | Robinson | 428/670 |
| 3,268,306 | 8/1966 | Jefferys | 428/661 |
| 3,309,292 | 3/1967 | Andrews | 428/661 |
| 4,123,594 | 10/1978 | Chang | 428/678 |

Primary Examiner—Michael L. Lewis
Attorney, Agent, or Firm—R. S. Sciascia; Henry Hansen; Stanton D. Weinstein

[57] ABSTRACT

Method and protective coating composition for preventing or minimizing combustion or melting of titanium and combustible alloys thereof. Two layers of coatings are applied, the first layer preventing diffusion of the second layer into the titanium or alloy even at elevated temperatures, and the second layer suppressing titanium combustion. The first layer contains chromium, molybdenum, niobium, tantalum, vanadium, zirconium, platinum, or rhodium or a combination thereof or alloy of any of these metals. The second layer contains copper, aluminum, gold, nickel, silver, cobalt or a combination thereof or alloy of any of these metals. By preventing diffusion of the second layer into the substrate, the first layer prevents degradation of substrate engineering or mechanical properties. When in an operating aircraft engine molten or burning titanium or other material arrives at the surface of the second layer, the second layer melts directly underneath the molten material which then is moved downstream by the engine airflow, leaving behind a non-melted substrate.

2 Claims, No Drawings

PROTECTIVE COATING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to coating processes and compositions, and more particularly to processes and coating compositions for suppressing combustion of metals, and to the products of such processes.

The relatively high strength, low density and high melting point of titanium has led to increasing use of titanium and titanium alloys in aircraft engine components such as fan and compressor vanes and blades, and in other applications. However, titanium can be made to ignite and react with air in an exothermic self-sustaining rapid oxidation process referred to as combustion. Titanium has a high heat of combustion, low thermal conductivity and a spontaneous ignition temperature below its melting point. These properties favor ignition and subsequent propagation of titanium or titanium alloy combustion rather than melting, thus producing additional rapid local temperature increases and rapid propagation of the resultant combustion once ignition occurs. During operation of aircraft jet engines, titanium blade ignition is often caused by rub. An abradable seal of rubber, felt metal or nickel-graphite, is present on the engine shroud adjacent to the compressor blades to prevent gas backflow and consequent loss of pressure. Without such a seal, efficiency of the compressor would be severely impaired. Accordingly, seal-blade separation is necessarily small. During engine operation, the blades heat up, expand with heat, and even creep, so that some blades thereby rub against the seal. Severe rubbing and abrasion may occur when an engine part fails, putting the engine out of balance, or when a failed blade imbeds itself in the seal. This abrasion between seal and blade(s) can cause ignition of the titanium. The high-velocity air stream in jet engines aids further to the combustion of any titanium or titanium alloy component that ignites and causes burning particles and molten metal to be sloughed off therefrom. These particles can be entrained in the engine air stream and impinge on downstream engine components to ignite them and thereby spread combustion in the engine. Some single-layer metallic and organic coatings have been used for reducing combustion of titanium substrates. However, an organic coating, particularly its binder, will generally vaporize or burn off, before its protection is needed, in a 600° F.–900° F. working environment such as found in operating jet turbine aircraft engines. Also, many metals, particularly those capable of forming an intermetallic with the substrate metal, can if coated on the substrate diffuse into and significantly degrade engineering or mechanical properties, such as fatigue endurance, of the substrate, particularly in a relatively hot gas turbine engine environment.

SUMMARY OF THE INVENTION

Accordingly, it is a general purpose of the present invention to provide composition and method capable of reducing the susceptibility of structures or members including combustible metals to combustion and to provide a combustion-resistant article.

Other objects of the present invention are to provide composition and method capable of reducing the susceptibility of such members or structures to ignition and propagation of combustion such as in aircraft engines without degrading mechanical or engineering properties of such structures or members, and to provide members and structures so improved.

Further objects of the present invention are to provide protective composition and method capable of suppressing combustion of titanium and titanium alloys in a hot air environment, improving the safety of engines incorporating titanium or titanium alloy components, protecting titanium metal or alloys from combustion in gas turbine engine environments after ignition occurs, making ignition more difficult, providing combustion suppression without degrading the engineering or mechanical properties of titanium and alloys thereof, reducing or eliminating sustained combustion of titanium, reducing titanium fires, reducing combustion propagation characteristics, and increasing resistance to fires, and which does not vaporize before its protection is needed.

Still further objects of the present invention are to provide a lightweight, high strength, heat-resistant member or structure which is protected from ignition and propagation of combustion but whose mechanical or engineering properties are not degraded by such protection.

Briefly, these and other objects of the present invention are accomplished by a protective method and protective coating system comprising two successively applied layers of different respective materials. The second-applied coating layer is formed of or containing material selected from the group of materials, such as metals whose melting point is below the melting point and the spontaneous ignition temperature of the substrate, and which are capable of liquifying and flowing well at the melting point of the substrate material. For a titanium or titanium alloy substrate, such materials include silver, copper, aluminum, gold, nickel, cobalt, and alloys thereof. The first-applied layer or undercoat is formed of or contains material which is capable of preventing diffusion of material from the second-applied layer into or completely through the first-applied layer and thus into the substrate. The substrate is thereby protected from degradation of material or engineering properties. For a titanium or titanium alloy substrate, such materials include chromium, molybdenum, niobium, tantalum, vanadium, zirconium, platinum, rhodium, and alloys or combinations thereof. The invention is especially applicable to substrates of combustible metals, particularly titanium or zirconium or alloys thereof. If a molten or burning fragment, such as of material similar to that of the substrate, lands on such a coated article, the topcoat(s) will melt before the substrate would, and acts as a lubricant to the impinging molten or burning material, which is thereby caused to slough off. Thus, combustion of the substrate is thereby prevented. If the second-applied coating is highly susceptible to oxidation in the environment in which the coated article is to be utilized, a third, oxidation-resistant coating such as nickel can be applied thereover; however, although this third-applied coating need only be relatively thin when compared with the other two coatings, it is preferred that it be of material having thermomechanical properties similar to those given above for the second layer.

DESCRIPTION OF THE PREFERRED EMBODIMENT

When titanium burns, it melts and flows. As the molten titanium flows, it provides heat energy to the surface over which it flows, heating, burning and melting titanium surface material if oxygen is present. When molten material produced by the ignition of titanium impinges on or flows onto bare titanium or titanium alloy, it sticks to and transfers heat energy to that titanium, causing that titanium to ignite or melt and generating a relatively large amount of molten material which then flows. This is a self-propagating process; more molten flowing material is generated as the process proceeds. The molten material flows on a solid surface in the form of a wave with a higher liquid front moving in the direction of air flow, a lower main portion of the wave upstream of the liquid front, and a burning front producing molten material at the or towards the end of the wave nearest the source of the air flow such as on an airfoil leading edge. For further information, see Anderson V. G. and Manty, B. A. *Titanium Alloy Ignition and Combustion*, Report No. NADC-76083-30, FR-9511 (NTIS Accession No. AD-A055 443/6Ga, abstracted Sept. 29, 1978) and Anderson, V. G. and Manty, B. A. *Titanium Alloy Ignition and Combustion*, Report No. NADC-77153-30, FR-10520 (NTIS Accession No. AD-A064 993/9Ga, abstracted July 6, 1979).

In the practice of a preferred embodiment the invention, at least two layers of respectively different metal or metal alloy coating are applied to a metal or metal alloy substrate. The first layer or undercoat is selected from the group of materials which will not form intermetallics with, and so do not adversely affect, mechanical or engineering properties of the substrate to which they are applied, particularly if the coated substrate is then placed in a high-temperature environment. The first layer should be metallurgically and chemically compatible with the base metal of the substrate. This first layer also prevents diffusion of material from the second layer into the substrate, which diffusion could adversely affect or degrade the substrate engineering or mechanical properties, as discussed above. For further information concerning compatibility of metals, see Manty, B. A. and Liss, H. R., *Wear Resistant Coatings for Titanium Alloys*, Report No. FR-8400 (NTIS Accession No. AD-A042 443/2GA, abstracted Oct. 14, 1977), P. 5, FIG. 1. This first layer can be applied by any conventional means, but is preferably applied by being diffused into the substrate, or by ion-plating (wherein ions of the material for this first layer are implanted into the substrate). The second or outer layer is selected from the group of materials having a melting point at least below the spontaneous ignition temperature and substantially below the melting point of the substrate. The second layer can be applied by any conventional means or method, such as electroplating. For titanium, the spontaneous ignition temperature is in the range of 2700°–2900° F., and the melting point is in the range of 3000°–3200° F., depending upon alloying and purity. The second layer, and the first layer as well, should also not liquify in the normal working environment for the coated substrate, particularly before its protection is needed.

When ignited and made to react in an exothermic rapid oxidation process, titanium melts. As the titanium melts, the resulting molten material flows. In an environment including flowing air such as in a gas turbine engine, the molten titanium flows with the direction of the airflow. For a titanium substrate experiencing combustion, the resulting molten titanium flows onto the surface of the nonmelted titanium, wetting that titanium, transferring energy into it, producing additional rapid temperature increases, rapidly propagating combustion thereto since the spontaneous ignition temperature of titanium is below the melting point of titanium, and producing more molten material. Thus, decoupling of the molten material from the nonmelted substrate prevents propagation of combustion.

The first layer, directly adjacent to the metal substrate, provides an elevated temperature diffusion barrier, preventing the second layer from diffusing into and degrading the substrate material. This first layer also prevents degradation of the substrate material during subsequent coating operations, and does not degrade the substrate material properties when applied thereto. The thickness of these coatings may range from 0.0001 inch to 0.01 inch, but is only required to be thick enough to prevent interaction of the substrate material with the second layer coating. For a titanium or titanium alloy substrate, materials which can be utilized in the first, or intermediate, layer include chromium, molybdenum, niobium (or columbium), tantalum, vanadium, zirconium, platinum, rhodium, or a combination or alloy thereof. Chromium, molybdenum, platinum and alloys of these elements are preferred.

The second layer is applied over the first layer, and provides effective suppression of titanium or other substrate material combustion. The suppression results from reduced coupling of energy to the substrate as the reacting molten metal breaks away from, rather than sticks to, the coated substrate's surface, and to a rather lesser extent to heat loss (heat of fusion) from the burning zone as a low melting temperature alloy melts, and heat conduction away from the burning zone to quench the process. The melting point of the second layer should be substantially below the melting point of the substrate, for example on the order of 250° F. or 200°–300° F. Thus, when pieces of molten substrate material from ignition elsewhere in the engine or other environment strike or land on the second layer of an article so coated or protected, the second layer melts only directly under that molten material before the substrate does, acting as a lubricant between that molten material and the substrate and substantially preventing transfer of heat therebetween. Accordingly, the liquid second-layer material should flow well at the substrate melting point. Accordingly, the second layer will melt before the impinging material can ignite or melt the substrate, and prevent the transfer of heat therebetween. Since the second layer is thereby heated to well above its melting temperature, it flows easily, separating and carrying off the molten material from the substrate. Since there is more energy input required to start fires (ignition) than to propagate or spread them, there is also greater resistance to ignition provided. Desired thickness of the coatings depends on the degree of protection desired, but should range from 0.0005 inch to 0.020 inch. The impinging molten material is thereby lubricated to go downstream with the engine or other airflow, leaving bare but nonmelted substrate behind. Although, bare, unprotected substrate is left behind, the substrate is only bare in a relatively small spot where the molten material lands. Since titanium combustion causes loss of power to the engine turbine or compressor blade on which it occurs, reducing engine performance, the aircraft or engine operator can tell when there has been a burn, and the engine, following landing and shutdown, can be stripped for immediate overall. Accordingly, two burns or impacts of burning material in the same spot is unlikely, so that the second layer provides real protection to the substrate. There is also a combustion suppressive effect provided by thermal conduction of the second layer, but this is relatively minimal, particularly compared with the combustion suppression provided by localized melting of the second layer. For a titanium or titanium alloy substrate, the second layer coating can include any one of the following elements: copper, aluminum, gold, or nickel. Cobalt or silver may also be used, but are less preferred. Silver would be preferred, except that it can cause stress corrosion cracking of titanium, although this problem could be eliminated with an appropriate first layer.

If the second layer is highly susceptible to oxidation, particularly in a hot air environment such as in an operating gas turbine engine compressor, then the second layer can be protected with a third, thin coating of material capable of preventing oxidation of the second layer. Although it is preferred that the third layer meet the same thermal criteria as the second layer, this is not absolutely necessary, because the third layer is thin. The third layer can for example be a flash coat of nickel.

The following specific examples are intended to illustrate the invention but not to limit in it any way:

EXAMPLE 1

A single layer of chromium 1 mil (0.001 inch) thick is applied by electroplating and diffusion to a substrate of Ti 8Al-1Mo-1V (Ti 8-1-1) titanium alloy.

EXAMPLE 2

A 1 mil thick single coating of chromium-molybdenum alloy (1% molybdenum) is applied by electroplating and diffusion to a Ti 8-1-1 substrate.

EXAMPLE 3

A single 1 mil thick coating of chromium-molybdenum alloy (5% molybdenum) is applied to a Ti 8-1-1 substrate by sputtering.

EXAMPLE 4

A 1 mil thick single coating of aluminum is applied to a Ti 8-1-1 substrate by ion vapor deposition (IVD).

EXAMPLE 5

A single coating of aluminum-manganese alloy (5 to 20% manganese) 1 mil thick is applied by electroplating to a Ti 8-1-1 alloy substrate.

EXAMPLE 6

A single layer of platinum 1 micron (1 microinch) thick is applied by ion-plating to a Ti 8-1-1 substrate.

EXAMPLE 7

A single 1 mil thick coating of cermet plate of chromium with occluded titanium carbide (TiC) is applied to a Ti 8-1-1 substrate.

EXAMPLE 8

A single coating of chromium-molybdenum alloy (1% molybdenum) 0.5 mil (0.0005 inch) thick is applied by electroplating and diffusing to a Ti 8-1-1 substrate. A second coating of aluminum 1 mil thick is then applied to the above first layer by ion vapor deposition.

EXAMPLE 9

A single coating of chromium-molybdenum alloy (1% molybdenum) 0.5 mil thick is applied to a Ti 8-1-1 substrate by electroplating and diffusion. A second coating of aluminum-manganese alloy (5–20% manganese) is then applied to a thickness of 1 mil by electroplating.

EXAMPLE 10

A chromium-molybdenum alloy (1% molybdenum) coating 0.5 mil thick is applied to a Ti 8-1-1 substrate by electroplating and diffusion. A second coating of copper 1 mil thick is then applied over the first coating by electroplating. A third, flash coat of nickel is then applied to the second coating by a relatively brief electroplating to a thickness of 0.2 mil or less to protect the copper from oxidation.

EXAMPLE 11

A 0.5 mil thick coating of chromium-molybdenum alloy (1% molybdenum) is applied to a Ti 8-1-1 substrate by electroplating and diffusion. A 1 mil thick coating of nickel is then applied to the first coating by electroplating.

EXAMPLE 12

A Ti 8-1-1 substrate is coated with ion-plated platinum to a thickness of 1 micron as in Example 6. A second coating of aluminum is then applied to the platinum coating by ion vapor deposition to a thickness of 1 mil.

EXAMPLE 13

A platinum-coated Ti 8-1-1 substrate is formed as in Example 6. A second coating of aluminum-manganese alloy (5–20% manganese) 1 mil thick is then applied to the platinum by electroplating.

EXAMPLE 14

A platinum-coated Ti 8-1-1 substrate is formed as in Example 6. A second coating of copper is then applied to the platinum by electroplating to a thickness of 1 mil. A flash coating of nickel is then applied to the copper to a thickness of 0.2 mil or less by electroplating for a relatively short period of time.

EXAMPLE 15

A single coating of nickel-phosphorous is deposited on a Ti 8-1-1 substrate by electroless process to a thickness of 1 mil.

Coated substrates produced as in Examples 1–15 were tested for ignition and combustion characteristics in the titanium combustion test rig described in the two reports by Anderson and Manty, supra, wherein under controlled temperature, pressure and airflow conditions, a $CO_2$ laser beam is aimed at a test specimen. The single-coating specimens (of Examples 1–7 and 15) were prepared and tested for purposes of comparison with the multi-layer coated specimens (Examples 8–14) of the invention. Two series of tests were conducted. In the first test, the coated specimens of Examples 1-14 were tested (Test 1) under test chamber conditions of 700° F. 110 psia and 800 ft/sec airflow. Only four specimens burned, indicating that 700° F. was not sufficiently severe to accomplish a ranking of the coatings. Accordingly, specimens which did not experience sustained combustion at 700° F. were retested at a different location on each specimen in a second test series (Test 2) conducted at 850° F., 110 psia and 800 ft/sec. The specimen of Example 15 was tested only during the second series of tests at 850° F. The results of these tests are summarized in Table I below:

TABLE I

| EXAMPLE | Test 1 % Burn | Test 2 % Burn |
| --- | --- | --- |
| 1 | 67% | No Test |
| 2 | 0 | 37% |
| 3 | 0 | 18% |
| 4 | 0 | ~1% |
| 5 | 0 | 55% |
| 6 | 100% | No Test |
| 7 | 0 | ~1% |
| 8 | 13% | No Test |
| 9 | 0 | 0 |
| 10 | 0 | 0 |
| 11 | 0 | 0 |
| 12 | 0 | 38% |
| 13 | 56% | No Test |
| 14 | 0 | 0 |
| 15 | No Test | 25% |

On the basis of the results of combustion testing shown in Table I, seven of the above examples were selected for fatigue testing. Ti 8-1-1 (AMS 4916) substrates coated as in Examples 4, 7, 8, 9, 10, 11, and 14, and an uncoated specimen as a control for baseline determination, were subjected to high cycle fatigue screening tests. Each specimen tested had a cantilever beam triangular gage section (constant stress in bending) which provided a large gage area upon which to apply the appropriate coatings, or no coating, to a Ti 8-1-1 (AMS 4916) substrate. Each specimen was tested at 80° F. in fully reversed bending ($R = -1$) and were electromagnetically vibrated to failure or 10 million cycles in the first bending mode at resonance (approximately 100 to 130 Hz). All tests loads and stresses were calculated based on Mc/I. Each specimen was individually loaded and calibrated to determine test deflection limits. A stress vs. cycles to failure (S-N) curve was developed using uncoated Ti 8-1-1 material as a baseline. From this curve a stress level ($\pm 55$ ksi) was obtained and used for the comparative testing of the coated and uncoated specimens. The results of the fatigue testing are given below in Table II.

TABLE II

| EXAMPLE | NO. CYCLE AT FAILURE |
| --- | --- |
| Control | $1.6 \times 10^5$ |
|  | $2.2 \times 10^5$ |
|  | $2.8 \times 10^5$ |
|  | $1.6 \times 10^6$ |
| 4 | $3.7 \times 10^5$ |
|  | $4.1 \times 10^5$ |
|  | Did not fail after $10^7$ |
|  | Did not fail after $10^7$ |
| 7 | $3.5 \times 10^4$ |
|  | $4.5 \times 10^4$ |
| 8 | $5.2 \times 10^4$ |
|  | $6.5 \times 10^4$ |
| 9 | $3.8 \times 10^4$ |
|  | $5.3 \times 10^4$ |
| 10 | $2.8 \times 10^4$ |
|  | $7.0 \times 10^4$ |
| 11 | $3.8 \times 10^4$ |
|  | $7.0 \times 10^4$ |
| 14 | $1.0 \times 10^5$ |
|  | $2.6 \times 10^5$ |

These tests were run at alternating stress of +55 ksi. All failed coated specimens had the origin located on the coated side in the gage area. From these latter test results, the most favorable coating is that of Example 4 (IVD aluminum) followed by that of Example 14 (Pt/Cu/Ni). The rest of the coated specimens, nearly all of which have undercoats of chromium-molybdenum alloy, are approximately equal in their relative rank order with somewhat reduced fatigue properties compared with the uncoated baseline material, although Example 7 (Cermet), the only single-layer coating in this group, has the poorest overall results. Ion-vapor deposition involves depositing the metal coating on a cold substrate, so that minimal or no diffusion into the substrate of coating material so deposited can occur. Since formation of aluminum-titanium intermetallic compounds is well known, the single-layer IVD aluminum coating of Example 4 would not be preferred in a gas turbine engine or similar environment where the coated specimen must necessarily be subjected to high temperatures (such as 500°-800° F.) for extended periods of time. Prolonged exposure to such an environment could cause diffusion of the coating into the substrate and formation of such intermetallics and thereby degradation of specimen substrate material properties.

In summary, operation of the foregoing invention will now be described. To a metallic substrate such as of flammable or combustible metal, two different successive coatings of metal or alloy are applied, one over the other, to protect the substrate from combustion. The first coating is of material which is capable of preventing diffusion of the material of the second coating into the substrate to degrade substrate material properties. The material utilized in the first coating must not itself be capable of forming intermetallic compounds with the material of the substrate, particularly upon diffusion therein and must not be capable of itself degrading material properties of the substrate. The second coating is of material having a melting point below the spontaneous ignition temperature, and at least approximately 200° F. below the melting point, of the substrate material. The second layer melts where struck by burning or molten material, and because it is molten it adheres to the impinging material rather than to the substrate, and carries off the impinging material before the latter can melt or ignite the substrate.

It should be understood that while platinum, chromium, molybdenum and alloys thereof have been shown above to be effective as a first-layer coating of the invention, niobium, tantalum, vanadium, zirconium, rhodium or combinations or alloys thereof should also be effective. Also, while copper, aluminum, nickel and aluminum-manganese alloy have been shown above to be effective materials for the second layer of the invention, gold, silver, cobalt and various alloys incorporating these and other second-layer materials given above should also be so usable. In particular, silver is found to be a preferred material for the second coating, but if used alone causes stress corrosion cracking in titanium substrates to which it is applied, so that an appropriate first coating is necessary therebetween to prevent degradation of substrate material properties. The present invention can be used to protect substrates of other metals than titanium, particularly zirconium and zirconium alloys, and possibly magnesium and magnesium alloys. The present invention may protect any metallic material experiencing combustion problems. The second-layer coating materials given above for titanium can be used with zirconium; niobium can be used in the undercoat.

Some of the many advantages of the present invention should now be readily apparent. For example, a novel protective method and coating composition have been provided which are capable of preventing or reducing combustion of combustible metals such as titanium and alloys thereof, particularly in a hot operating environment such as a jet turbine engine. This is accomplished without substantial degradation of material properties of the structure to which this method or composition is applied. Thus, substrate materials which have highly desirable properties but would be otherwise effectively unusable can be utilized in certain critical environments such as high-temperature environments. Accordingly, a fire-resistant structure has been provided which is lightweight and durable.

Obviously, many modifications and variations of the present invention are possible in light of the above teachings. It is therefore to be understood that, within the scope of the appended claims, the invention may be practiced otherwise than as specifically described.

What is claimed is:

1. A combustion and melting resistant member comprising:
    a metallic substrate consisting essentially of titanium or alloys thereof;
    a first metallic coating selected from the group consisting of molybdenum and platinum and adhering to said substrate;
    a second metallic coating comprising copper and having a melting point below the spontaneous ignition temperature and substantially below the melting point of said substrate, wherein said first coating is capable of preventing diffusion from said second coating into said substrate; and
    a third metallic coating comprising nickel and contacting said second coating for preventing oxidation of said second coating.

2. A member as recited in claim 1 wherein:
said first coating comprises molybdenum and adheres to said substrate.

* * * * *